United States Patent
Inoue

(10) Patent No.: US 11,932,128 B2
(45) Date of Patent: Mar. 19, 2024

(54) CHARGE/DISCHARGE DEVICE, AND METHOD FOR MANAGING STORED ELECTRICAL ENERGY IN ELECTRICAL ENERGY STORAGE DEVICE

(71) Applicant: MAKITA CORPORATION, Anjo (JP)

(72) Inventor: Hiroshi Inoue, Anjo (JP)

(73) Assignee: MAKITA CORPORATION, Anjo (JP)

( * ) Notice: Subject to any disclaimer, the term of this patent is extended or adjusted under 35 U.S.C. 154(b) by 624 days.

(21) Appl. No.: 17/252,951

(22) PCT Filed: Jul. 2, 2019

(86) PCT No.: PCT/JP2019/026329
§ 371 (c)(1),
(2) Date: Dec. 16, 2020

(87) PCT Pub. No.: WO2020/013036
PCT Pub. Date: Jan. 16, 2020

(65) Prior Publication Data
US 2021/0188109 A1    Jun. 24, 2021

(30) Foreign Application Priority Data
Jul. 12, 2018   (JP) .................................. 2018-132631

(51) Int. Cl.
*H02J 7/00*   (2006.01)
*B60L 53/30*  (2019.01)
(Continued)

(52) U.S. Cl.
CPC ............. *B60L 53/305* (2019.02); *B60L 58/10* (2019.02); *H01M 10/48* (2013.01);
(Continued)

(58) Field of Classification Search
USPC ................. 320/106, 107, 108, 109, 110, 112
See application file for complete search history.

(56) References Cited

U.S. PATENT DOCUMENTS

2012/0212174 A1    8/2012  Ishikawa et al.
2012/0268068 A1*  10/2012  Jung ....................... B60R 16/03
                                                                    320/109
(Continued)

FOREIGN PATENT DOCUMENTS

CN    102484377 A    5/2012
CN    103503273 A    1/2014
(Continued)

OTHER PUBLICATIONS

Sep. 3, 2019 International Search Report issued in International Patent Application No. PCT/JP2019/026329.
(Continued)

*Primary Examiner* — Brian Ngo
(74) *Attorney, Agent, or Firm* — Oliff PLC

(57) ABSTRACT

A charge/discharge device includes an electrical energy storage device, an electric power receiver, an electric power generator, electric power outputters, and a controller. The electric power receiver receives a charging power from a charger for charging an electric vehicle.

25 Claims, 10 Drawing Sheets

(51) Int. Cl.
*B60L 58/10* (2019.01)
*H01M 10/48* (2006.01)
*H01M 50/569* (2021.01)

(52) U.S. Cl.
CPC ......... *H01M 50/569* (2021.01); *H02J 7/0013* (2013.01); *H02J 7/0045* (2013.01); *H02J 7/0047* (2013.01); *H02J 7/00714* (2020.01)

(56) References Cited

U.S. PATENT DOCUMENTS

| | | | |
|---|---|---|---|
| 2013/0169231 A1 | 7/2013 | Hotta | |
| 2014/0021780 A1* | 1/2014 | Choi | B60L 53/64 |
| | | | 320/109 |
| 2014/0103858 A1 | 4/2014 | Bertsch et al. | |
| 2014/0191705 A1 | 7/2014 | Takao et al. | |
| 2015/0171632 A1 | 6/2015 | Fry et al. | |
| 2016/0039296 A1 | 2/2016 | Nakamura et al. | |
| 2017/0005494 A1 | 1/2017 | Li et al. | |
| 2018/0026546 A1 | 1/2018 | Iisaka et al. | |
| 2018/0323621 A1 | 11/2018 | Fry et al. | |
| 2020/0185670 A1 | 6/2020 | Hiratsuka | |

FOREIGN PATENT DOCUMENTS

| | | | |
|---|---|---|---|
| CN | 105307894 A | | 2/2016 |
| CN | 103942886 B | * | 12/2016 |
| JP | 2006-020438 A | | 1/2006 |
| JP | 2012-34554 A | | 2/2012 |
| JP | 2013130963 A | * | 7/2013 |
| JP | 2017-016659 A | | 1/2017 |
| WO | 2013/001909 A1 | | 1/2013 |
| WO | 2015/155811 A1 | | 10/2015 |
| WO | 2016/132739 A1 | | 8/2016 |
| WO | 2018/074446 A1 | | 4/2018 |

OTHER PUBLICATIONS

Aug. 16, 2022 Office Action issued in Japanese Patent Application No. 2018-132631.
Jan. 12, 2021 International Preliminary Report on Patentability issued in International Patent Application No. PCT/JP2019/026329.
Feb. 8, 2022 Office Action issued in Japanese Patent Application No. 2018-132631.
Oct. 7, 2023 Office Action issued in Chinese Patent Application No. 201980046055.7.
Jun. 9, 2023 Pretrial Reexamination Report issued in Japanese Patent Application No. 2018-132631.
Dec. 19, 2023 Appeal Decision issued in Japanese Patent Application No. 2018-132631.

* cited by examiner

| MANAGEMENT VARIABLE TABLE | |
|---|---|
| ELECTRIC POWER OUTPUTTER (SLOT) | MANAGEMENT VARIABLE |
| 1 | B: BATTERY COMMUNICATION PROCESS |
| 2 | C: DEVICE CHARGE CONTROL PROCESS |
| 3 | A: BATTERY DETECTION |
| ⋮ | ⋮ |
| $N_{max-1}$ | E: CHARGING ERROR PROCESS |
| $N_{max}$ | D: CHARGING STOP PROCESS |

FIG. 5A

| TYPES OF BATTERY MANAGEMENT VARIABLE | |
|---|---|
| A | BATTERY DETECTION |
| B | BATTERY COMMUNICATION PROCESS |
| C | DEVICE CHARGE CONTROL PROCESS |
| D | CHARGING STOP PROCESS |
| E | CHARGING ERROR PROCESS |

FIG. 5B

CHARGE/DISCHARGE DEVICE, AND METHOD FOR MANAGING STORED ELECTRICAL ENERGY IN ELECTRICAL ENERGY STORAGE DEVICE

CROSS-REFERENCE TO RELATED APPLICATION

This international application claims the benefit of Japanese Patent Application No. 2018-132631 filed on Jul. 12, 2018 with the Japan Patent Office, and the entire disclosure of Japanese Patent Application No. 2018-132631 is incorporated in this international application by reference.

TECHNICAL FIELD

The present disclosure relates to a charge/discharge device and to a method for managing stored electrical energy in an electrical energy storage device.

BACKGROUND ART

A charge/discharge device disclosed in Patent Document 1 specified below includes an electrical energy storage device inside the charge/discharge device, and is configured such that the electrical energy storage device is charged using a general commercial power supply (also referred to as a commercial AC power supply) and such that power supply to an external device is carried out by discharge of the electrical energy storage device.

This charge/discharge device is configured to be portable. Thus, such charging of the electrical energy storage device using the general commercial power supply enables power supply to an external device with the electrical energy stored in the electrical energy storage device.

This makes it possible, even in a place with no general commercial power supply (e.g., outdoors), to supply power to an external device using the charge/discharge device and thus to use the external device. Further, in a case where the external device is a battery pack, even when the electric power of the battery pack is used up, the battery pack can be reused by charging the battery pack using the charge/discharge device.

PRIOR ART DOCUMENTS

Patent Documents

Patent Document 1: United States Patent Application Publication No. 2014/0103858

SUMMARY OF THE INVENTION

Problems to be Solved by the Invention

In the above-described charge/discharge device, however, an electrical energy chargeable per unit time is small due to use of the general commercial power supply in charging the electrical energy storage device, and thus, a time required to charge the electrical energy storage device may be long. For example, it may take as long as several hours or more to charge the electrical energy storage device.

In addition, since the number of external devices that can be connected concurrently to the above-described charge/discharge device is one, it is impossible to supply power to two or more external devices concurrently, and thus, two or more external devices cannot be used concurrently. For example, in the case where the external devices are battery packs, in order to charge the two or more battery packs using the above-described charge/discharge device, these battery packs have to be charged one by one in turn. This may prolong the time required for the above-described charge/discharge device to charge the two or more battery packs.

Accordingly, it is desirable that one aspect of the present disclosure can reduce a time required to charge an electrical energy storage device as compared with a case of using a general commercial power supply, and also can supply power to at least two external devices concurrently.

Means for Solving the Problems

A charge/discharge device according to one aspect of the present disclosure includes an electric power receiver, an electrical energy storage device, a first electric power outputter, a second electric power outputter, an electric power generator, and a controller.

The electric power receiver receives a charging power from a charger for charging an electric vehicle. The electrical energy storage device is charged with the charging power. The first electric power outputter connects to a first external device and outputs a first discharge power to the first external device. The second electric power outputter connects to a second external device and outputs a second discharge power to the second external device. The electric power generator generates the first discharge power and the second discharge power based on a stored electrical energy in the electrical energy storage device. The controller performs a charge control of the electrical energy storage device and/or a discharge control of the electrical energy storage device.

In charging the electrical energy storage device, the charge/discharge device receives the charging power from the charger for charging an electric vehicle. Since this charger is for charging an electric vehicle, this charger is configured to be able to supply a greater electrical energy per unit time than a commercial AC power supply (e.g., voltage value: 100 V, current value: 10 A). Thus, as compared with a case of using the commercial AC power supply, the charge/discharge device can achieve a greater electrical energy chargeable per unit time, thus reducing a time required to charge the electrical energy storage device.

Moreover, since the charge/discharge device includes the first electric power outputter and the second electric power outputter, it is possible to concurrently supply power to the first external device and the second external device, respectively. In a case where the charge/discharge device includes three or more electric power outputters, the respective electric power outputters may connect to corresponding external devices in a one-to-one relationship.

Accordingly, the charge/discharge device achieves concurrent power supply to at least two external devices, in addition to shorter time required to charge the electrical energy storage device than in the case of using a general commercial power supply.

The electrical energy storage device may have a charge capacity of, for example, 4.0 kWh or more. The charger may be configured to be able to output electric power of, for example, 100 kW or more. Further, the charger may be configured to be able to output electric power having a voltage range of 50 to 500 [V] and a maximum current value of 400 [A].

In any charge/discharge device described above, the electric power generator may include a first discharge power generator and a second discharge power generator. The first discharge power generator generates the first discharge power based on the stored electrical energy and supplies the first discharge power to the first electric power outputter. The second discharge power generator generates the second discharge power based on the stored electrical energy and supplies the second discharge power to the second electric power outputter.

Since the electric power generator includes the first discharge power generator and the second discharge power generator as described above, the voltage value and current value of the first discharge power to be outputted to the first electric power outputter can be set so as to be different from the voltage value and current value of the second discharge power to be outputted to the second electric power outputter.

This enables the charge/discharge device to supply an individualized electric power corresponding to each of the first external device and the second external device, thus enabling power supply based on appropriate magnitudes of voltage and current set individually according to a type and so on of each of the first external device and the second external device.

In any charge/discharge device described above, a storage information acquirer may be provided. In the charge control of the electrical energy storage device, the controller may determine whether the electrical energy storage device is in a proper state based on a storage information.

The storage information acquirer may be configured to acquire the storage information indicating a state of the electrical energy storage device. In the charge control of the electrical energy storage device, the controller may determine whether the electrical energy storage device is in the proper state based on the storage information acquired by the storage information acquirer. The controller may perform the charge control in response to determining that the electrical energy storage device is in the proper state, and may stop the charge control in response to determining that the electrical energy storage device is not in the proper state.

Since this enables the controller to determine whether the electrical energy storage device is in the proper state in the charge control of the electrical energy storage device, the electrical energy storage device in the proper state can be charged appropriately, and a trouble to be caused by the charging operation to the electrical energy storage device not in the proper state can be inhibited. Examples of the storage information may include a temperature of the electrical energy storage device and a voltage value in the electrical energy storage device. Examples of the trouble in the charge control may include failure of or damage to the charge/discharge device, and failure of or damage to the charger.

Next, in any charge/discharge device described above, a storage information acquirer may be provided. In the discharge control of the electrical energy storage device, the controller may determine whether the electrical energy storage device is in a proper state based on a storage information.

The storage information acquirer may acquire the storage information indicating a state of the electrical energy storage device. In the discharge control of the electrical energy storage device, the controller may determine whether the electrical energy storage device is in the proper state based on the storage information acquired by the storage information acquirer. The controller may perform the discharge control in response to determining that the electrical energy storage device is in the proper state, and may stop the discharge control in response to determining that the electrical energy storage device is not in the proper state.

Since this enables the controller to determine whether the electrical energy storage device is in the proper state in the discharge control of the electrical energy storage device, discharge can be performed appropriately by the electrical energy storage device in the proper state, and a trouble to be caused by the discharge operation by the electrical energy storage device not in the proper state can be inhibited. Examples of the trouble in the discharge control may include failure of or damage to the charge/discharge device, and failure of or damage to the external device.

Next, in any charge/discharge device described above, an external device information acquirer may be provided. In the discharge control of the electrical energy storage device, the controller may determine whether each of the first external device and the second external device is in a proper state based on a first external device information and a second external device information, respectively.

The external device information acquirer is configured to acquire the first external device information and the second external device information. The first external device information is information indicating a state of the first external device. The second external device information is information indicating a state of the second external device. In the discharge control of the electrical energy storage device, the controller may determine whether each of the first external device and the second external device is in the proper state based on the first external device information and the second external device information, respectively, acquired by the external device information acquirer. The controller may perform the discharge control in response to determining that both of the first external device and the second external device are in the proper state, and may stop the discharge control in response to determining that the first external device or the second external device is not in the proper state.

Since this enables the controller to determine whether each of the first external device and the second external device is in the proper state in performing the discharge control of the electrical energy storage device, the external device in the proper state can be supplied with power appropriately, and a trouble to be caused by power supply to the external device not in the proper state can be inhibited. Examples of the external device information may include a temperature of the external device and a voltage value in the external device. Examples of the trouble in the discharge control may include failure of or damage to the charge/discharge device, and failure of or damage to the external device.

Next, in any charge/discharge device described above, a first current detector may be provided. The controller may perform the charge control of the electrical energy storage device based on a first current value acquired by the first current detector. The first current detector may detect the first current value. The first current value may be a value of a current flowing through the electrical energy storage device.

In this way, by including the first current detector, the charge/discharge device can detect the value of a first current flowing through the electrical energy storage device in performing the charge control of the electrical energy storage device, and can determine whether the first current value is within a normal range, thereby achieving the charge control based on the proper current value.

Next, in any charge/discharge device described above, a first current detector and a second current detector may be provided. The controller may perform the discharge control of the electrical energy storage device based on a first current value acquired by the first current detector and on a second current value and/or a third current value each acquired by the second current detector.

The first current detector may detect the first current value. The first current value may be a value of a current flowing through the electrical energy storage device. The second current detector may detect the second current value and/or the third current value. The second current value may be a value of a second current flowing from the first electric power outputter to the first external device. The third current value may be a value of a third current flowing from the second electric power outputter to the second external device.

In this way, by including the first current detector, the charge/discharge device can detect the first current value outputted from the electrical energy storage device in performing the discharge control of the electrical energy storage device, and can determine whether the first current value is within a normal range, thereby achieving the discharge control based on the proper current value.

Furthermore, by including the second current detector, the charge/discharge device can detect the second current value and the third current value to be outputted to the first external device and the second external device, respectively, in performing the discharge control of the electrical energy storage device. The charge/discharge device can determine whether each of the second current value and the third current value is within a normal range, thereby achieving the discharge control based on the second current value and the third current value controlled within the normal range.

Next, in any charge/discharge device described above, the second current detector may detect both of the second current value and the third current value. The controller may perform the discharge control of the electrical energy storage device based on the first current value, the second current value, and the third current value.

This enables the charge/discharge device, in the discharge control of the electrical energy storage device, to determine whether the values of a second current and a third current flowing to the first external device and the second external device, respectively, are each within a normal range. Accordingly, the charge/discharge device can achieve the discharge control based on the second current value and the third current value controlled within the normal range in the first external device and the second external device, respectively.

Next, in any charge/discharge device described above, the first external device or the second external device may include a battery pack for an electric-powered work machine. This enables the charge/discharge device to charge the battery pack for an electric-powered work machine connected to the electric power outputter by discharge of the electrical energy storage device.

Another aspect of the present disclosure is a method for managing a stored electrical energy in an electrical energy storage device, and the method includes: receiving a charging power from a charger for charging an electric vehicle; charging the electrical energy storage device with the charging power; generating a first discharge power based on the stored electrical energy in the electrical energy storage device; generating a second discharge power based on the stored electrical energy; outputting the first discharge power to a first external device; and outputting the second discharge power to a second external device.

Such a method may produce effects similar to those of the above-described charge/discharge device.

BRIEF DESCRIPTION OF THE DRAWINGS

FIG. 5A is an explanatory diagram showing one example of arrangement of a management variable table, and FIG. 5B is an explanatory diagram showing examples of types of battery management variables.

EXPLANATION OF REFERENCE NUMERALS

1 . . . charge/discharge device, 3 . . . charger (EV charger), 3A . . . coupling connector, 5 . . . external device (battery pack), 11 . . . electrical energy storage device, 11c . . . rechargeable battery, 13 . . . electric power receiver (charging connector), 13a . . . main current-carrying terminal, 13b . . . control signal terminal, 13c . . . CAN communication terminal, 15 . . . electric power outputter (discharge connector, slot), 15a . . . positive-electrode output terminal, 15b . . . negative-electrode output terminal, 15c . . . communication terminal, 17 . . . controller, 17a . . . CPU (operation part), 17b . . . memory (memory part), 19 . . . current-carrying path, 19a . . . positive-electrode path, 19b . . . negative-electrode path, 21 . . . conduction switcher, 23 . . . protector, 25 . . . storage information acquirer, 27 . . . temperature detector, 29 . . . current detector, 30 . . . electric power generator, 31 . . . discharge power generator, 33 . . . output current detector, 35 . . . driving voltage generator, 37 . . . user interface.

MODE FOR CARRYING OUT THE INVENTION

An example embodiment of the present disclosure will be described below with reference to the drawings.

It is obvious that the present disclosure is not limited to the embodiment below and can take various forms insofar as they are within the technical scope of the present disclosure.

1. First Embodiment 1-1. Overall Configuration

Figure 1:
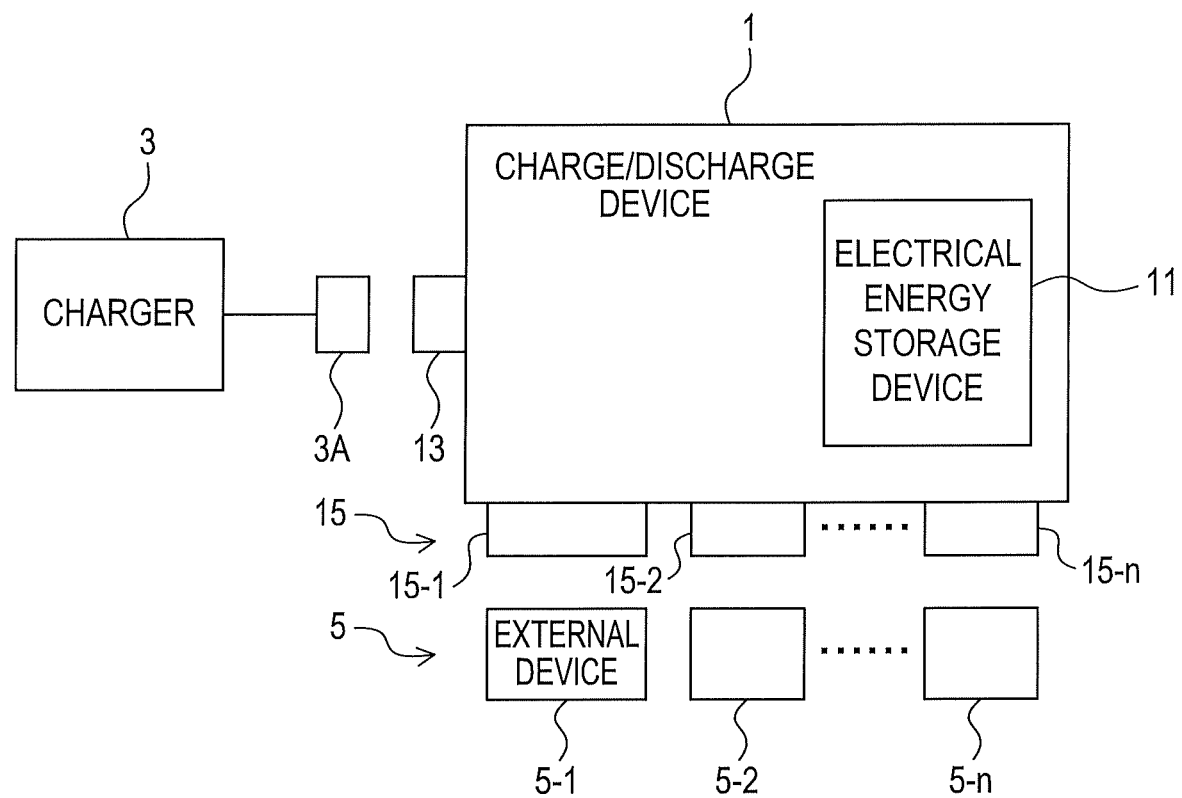
FIG. 1 is an explanatory diagram showing a charge/discharge device, a charger, and external devices.

As shown in FIG. 1, a charge/discharge device 1 of a first embodiment includes an electrical energy storage device 11 inside the charge/discharge device 1. The charge/discharge device 1 is configured such that the electrical energy storage device 11 is charged with electric power (charging power) supplied from a charger 3 (also referred to as an EV charger 3) for charging an electric vehicle. The charge/discharge device 1 is configured to supply power to a first external device 5-1, a second external device 5-2, . . . , and an nth external device 5-n by discharge of the electrical energy storage device 11. The above-mentioned "n" corresponds to the maximum number of external devices 5 connectable to the charge/discharge device 1. In the descriptions below, a group of the first external device 5-1, the second external device 5-2, . . . , and the nth external device 5-n is also referred to as external devices 5.

The electrical energy storage device 11 includes a rechargeable battery that is chargeable and dischargeable. A charge capacity of the electrical energy storage device 11 is approximately 8.0 kWh, and the charge capacity of the electrical energy storage device 11 has a charge capacity of 4.0 kWh or more.

The charge/discharge device 1 includes an electric power receiver 13 (also referred to as a charging connector 13), a first electric power outputter 15-1, a second electric power outputter 15-2, . . . , and an nth electric power outputter 15-n (hereinafter also referred to as a first discharge connector 15-1, a second discharge connector 15-2, . . . , and an nth discharge connector 15-n, respectively). The above-mentioned "n" corresponds to the number of electric power outputters 15 (hereinafter also referred to as discharge connectors 15) provided to the charge/discharge device 1. In the descriptions below, a group of the first electric power outputter 15-1, the second electric power outputter 15-2, . . . , and the nth electric power outputter 15-n is also referred to as electric power outputters 15.

The electric power receiver 13 is configured to be connected to a coupling connector 3A of the EV charger 3. The electric power receiver 13 is configured to receive charging power for charging the electrical energy storage device 11 from the EV charger 3. The EV charger 3 is configured with a high-output charger that can output electric power of, for example, 100 kW or more. The EV charger 3 is a charger having an outputtable voltage range of 50 to 500 [V] and an outputtable maximum current value of 400 [A].

Examples of the EV charger 3 may include an EV station quick charger used for charging an electric vehicle (EV). For example, the EV station quick charger converts electric power from a three-phase AC 200 V power supply (not shown) into a direct power according to the CHAdeMO standard, and outputs a direct voltage with a maximum voltage of 500 V and a maximum current of 400 A from the coupling connector 3A. To charge the electrical energy storage device 11 (having the charge capacity of approximately 8.0 kWh) with voltage of 200 V and electric current of 120 A using the EV charger 3, a time required for charging is approximately 0.33 hour (approximately 20 minutes).

The first electric power outputter 15-1 to the nth electric power outputter 15-n are configured to connect respectively to the first external device 5-1 to the nth external device 5-n in a one-to-one relationship. The first electric power outputter 15-1 to the nth electric power outputter 15-n are configured to output individualized discharge powers to the first external device 5-1 to the nth external device 5-n connected thereto, respectively. The external device 5 is a device configured to be able to receive electric power, and examples thereof may include a battery pack used as a source of electrical energy for an electric-powered work machine or the like, and an electric apparatus driven by being supplied with electric power. The battery pack is configured to be detachably attached (connected) to various rechargeable electric-powered work machines, such as, for example, a rechargeable electric power tool, a rechargeable cleaner, a rechargeable grass cutter, and is configured to be able to supply power to a driving source thereof (e.g., a motor).

One example of the external device 5 to be connected to the charge/discharge device 1 of the present embodiment may be a battery pack 5 to be attached to an electric gardening apparatus. The electric gardening apparatus is used by, for example, workers (landscapers) who perform services such as cleaning of parks and maintenance of trees. Examples of the electric gardening apparatus may include a gardening blower that discharges strong air for collecting fallen leaves and so on.

1-2. Charge/discharge Device

Figure 2:
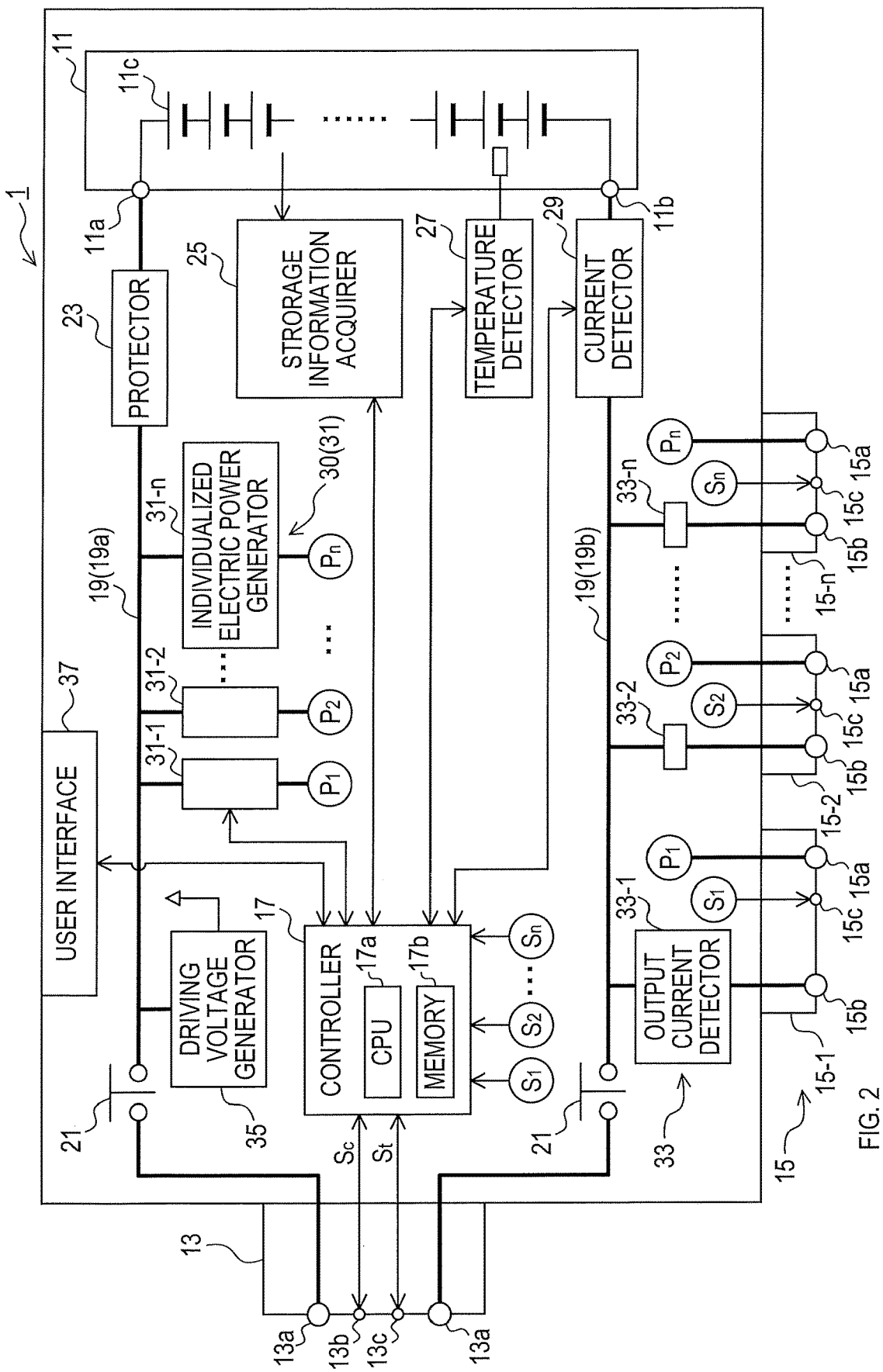
FIG. 2 is a block diagram showing an electrical configuration of the charge/discharge device.

As shown in FIG. 2, the charge/discharge device 1 includes the electrical energy storage device 11, the electric power receiver 13, the electric power outputters 15, a controller 17, a current-carrying path 19, conduction switchers 21, a protector 23, a storage information acquirer 25, a temperature detector 27, a current detector 29, an electric power generator 30, a first output current detector 33-1, a second output current detector 33-2, . . . , an nth output current detector 33-n, a driving voltage generator 35, and a user interface 37. The electric power generator 30 includes a first discharge power generator 31-1, a second discharge power generator 31-2, . . . , and an nth discharge power generator 31-n. The above-mentioned "n" corresponds to the number of discharge power generators 31 provided to the electric power generator 30. In the descriptions below, a group of the first discharge power generator 31-1, the second discharge power generator 31-2, . . . , and the nth discharge power generator 31-n is also referred to as discharge power generators 31.

The electrical energy storage device 11 includes a positive-electrode terminal 11a, a negative-electrode terminal 11b, and a rechargeable battery 11c. The positive-electrode terminal 11a is connected to a positive electrode of the rechargeable battery 11c, and the negative-electrode terminal 11b is connected to a negative electrode of the rechargeable battery 11c. The rechargeable battery 11c is a battery that is chargeable and dischargeable, and includes battery cells connected in series to each other. The rechargeable battery 11c has an output voltage of approximately 200 [V] and has a current capacity of 40 [Ah]. That is, the charge capacity of the rechargeable battery 11c is approximately 8.0 kWh (=approximately 200 [V]×40 [Ah]). Accordingly, as described above, the charge capacity of the electrical energy storage device 11 is approximately 8.0 kWh, and the charge capacity of the electrical energy storage device 11 has a charge capacity of 4.0 kWh or more.

The electrical energy storage device 11 is connected to the electric power receiver 13 via the current-carrying path 19. The current-carrying path 19 includes a positive-electrode path 19a and a negative-electrode path 19b. The positive-electrode terminal 11a is connected to the electric power receiver 13 via the positive-electrode path 19a, and the negative-electrode terminal 11b is connected to the electric power receiver 13 via the negative-electrode path 19b.

The electric power receiver 13 includes a main current-carrying terminal 13a, a control signal terminal 13b, and a Controller Area Network communication terminal 13c (hereinafter also referred to as a CAN communication terminal 13c). The main current-carrying terminal 13a is connected to the current-carrying path 19 (the positive-electrode path 19a, the negative-electrode path 19b), and is configured to be connected to a main current-carrying terminal (not shown) of the coupling connector 3A (see FIG. 1). The control signal terminal 13b is connected to the controller 17, and is configured to be connected to a control signal terminal (not shown) of the coupling connector 3A. The CAN communication terminal 13c is connected to the controller 17, and is configured to be connected to a CAN communication terminal (not shown) of the coupling connector 3A. CAN is a registered trademark.

Each of the electric power outputters 15 includes a positive-electrode output terminal 15a, a negative-electrode output terminal 15b, and a communication terminal 15c. Each positive-electrode output terminal 15a is connected to a corresponding one of the discharge power generators 31, and is configured to be connected to a positive-electrode terminal (not shown) of the corresponding external device 5 (see FIG. 1). Each negative-electrode output terminal 15b is connected to the negative-electrode path 19b, and is configured to be connected to a negative-electrode terminal (not shown) of the corresponding external device 5. Each communication terminal 15c is connected to the controller 17, and is configured to be connected to a control signal terminal (not shown) of the corresponding external device 5.

The conduction switchers 21 are provided one by one on the positive-electrode path 19a and the negative-electrode path 19b in the current-carrying path 19. Each conduction switcher 21 includes a selector switch to switch the current-carrying path 19 to a completed state or to an interrupted state (open state). The conduction switcher 21 enters an interrupted state when a specified interruption condition is established, and enters a completed state when a specified conduction condition is established.

Examples of the specified interruption condition may include "the coupling connector 3A is not connected to the electric power receiver 13". Other examples of the interruption condition may include "the coupling connector 3A is connected to the electric power receiver 13, but a value of current flowing through the current-carrying path 19 is out of a normal range". Examples of the specified conduction condition may include "the coupling connector 3A is connected to the electric power receiver 13, and the value of current flowing through the current-carrying path 19 is within the normal range".

The controller 17 performs various control processes in the charge/discharge device 1. The controller 17 performs, for example, a charge control for charging the electrical energy storage device 11, a discharge control for discharging the electrical energy storage device 11, an improper-state detection process for detecting an improper state of each part in the charge/discharge device 1. The controller 17 includes a CPU 17a (hereinafter also referred to as an operation part 17a), a memory 17b (hereinafter also referred to as a memory part 17b), and so on. Functions of the controller 17 are achieved mainly by execution, by the CPU 17a, of various programs stored in the memory 17b.

The protector 23 is provided on the positive-electrode path 19a in the current-carrying path 19. The protector 23 is configured to determine whether the value of current flowing through the positive-electrode path 19a is within the normal range, and to enter a completed state when the value of current is within the normal range and to enter an interrupted state (open state) when the value of current is out of the normal range. When an improper current flows through the current-carrying path 19, the protector 23 electrically interrupts the current-carrying path 19, thereby protecting the charge/discharge device 1, the EV charger 3, and the external device 5 from the improper current. The protector 23 may be configured, for example, with a fuse, a self-control protector (SCP), or a field-effect transistor (FET).

The storage information acquirer 25 is configured to acquire (detect) storage information indicating a state of the electrical energy storage device 11. Examples of the storage information may include a temperature of the electrical energy storage device 11 (a temperature of the rechargeable battery 11c), a voltage value of the rechargeable battery 11c, voltage values of the respective battery cells in the rechargeable battery 11c, and a balance state of the voltage values of the respective battery cells.

The storage information acquirer 25 is configured, for example, with an analog front-end (AFE). In accordance with a command from the controller 17, the storage information acquirer 25 detects (acquires) the voltage value of the rechargeable battery 11c and the voltage values of the respective battery cells, and outputs the detection results to the controller 17. Further, in accordance with a command from the controller 17, the storage information acquirer 25 detects (acquires) a value of current flowing through the electrical energy storage device 11 (the rechargeable battery 11c) (a charging current value, a discharge current value), and outputs the detection result to the controller 17.

The temperature detector 27 detects a temperature of the rechargeable battery 11c and temperatures of the respective battery cells in the rechargeable battery 11c, and outputs the detection results to the controller 17.

The current detector 29, which is provided on the negative-electrode path 19b in the current-carrying path 19, detects a value of current flowing through the current-carrying path 19 (the negative-electrode path 19b), and outputs the detection result to the controller 17. In other words, the current detector 29 detects the value of current flowing through the electrical energy storage device 11 (the charging current value, the discharge current value), and outputs the detection result to the controller 17.

The first discharge power generator 31-1, the second discharge power generator 31-2, . . . , and the nth discharge power generator 31-n are each configured to generate the individualized discharge power, using the electrical energy storage device 11 as a source of electrical energy. For example, the discharge power generator 31 is configured to voltage-convert a discharge power of the electrical energy storage device 11 and to output the voltage-converted power as the individualized discharge power. The discharge power generator 31 is configured to be able to output, as the individualized discharge power, an individually set power Pp having a voltage value of 10 V or more and a current value of 6 A or more. The first discharge power generator 31-1, the second discharge power generator 31-2, . . . , and the nth discharge power generator 31-n supply the individualized discharge powers to the first electric power outputter 15-1, the second electric power outputter 15-2, . . . , and the nth electric power outputter 15-n, respectively. In the present embodiment, an output voltage Vse of the electrical energy storage device 11 during discharge is approximately 200 [V], and a voltage after voltage-conversion by the discharge power generator 31 (hereinafter also referred to as an individualized discharge voltage Vcn) is up to 22.0 [V].

The discharge power generator 31 is not configured to always output a constant current as a current value of the individualized discharge power but configured to control the current value of the individualized discharge power according to change in the remaining charging energy of the battery pack 5. For example, just before completion of the charging, the current value is controlled so as to be reduced to around 1 [A]. Further, the configuration of the discharge power generator 31 is not limited to that to generate the individualized discharge power by the voltage conversion, and any configuration, such as that in which the individualized discharge power as a constant current is generated, may be adopted as long as the configuration is such that the individualized discharge power suitable for the external device 5 is generated.

In the present embodiment, the discharge power generators 31 output the respective individualized discharge voltages Vcn to the corresponding electric power outputters 15. The individualized discharge voltages Vcn all have the same voltage value. The individualized discharge voltages Vcn may be different voltages according to the respective electric power outputters 15.

Upon receiving a discharge command from the controller 17, each of the discharge power generators 31 outputs the individualized discharge power. When receiving no discharge command from the controller 17, the discharge power generator 31 stops outputting the individualized discharge power.

The first output current detector 33-1, the second output current detector 33-2, . . . , and the nth output current detector 33-n are each provided on a corresponding one of current-carrying paths connecting the current-carrying path 19 (the negative-electrode path 19b) to the negative-electrode output terminals 15b of the corresponding electric power outputters 15. In the descriptions below, a group of the first output current detector 33-1, the second output current detector 33-2, . . . , and the nth output current detector 33-n is also referred to as output current detectors 33. The respective output current detectors 33 are provided so as to correspond to the electric power outputters 15 in a one-to-one relationship. The output current detectors 33 each detect, for a corresponding one of the electric power outputters 15, a value of current of the individualized discharge power to be supplied to the corresponding external device 5 (an individualized discharge current value), and output the detection result to the controller 17. The output current detector 33 is configured to acquire (detect) external device information indicating a state of the external device 5. The external device information acquired by the output current detector 33 is a value of current flowing to the external device 5 (the individualized discharge current value).

In a case of being supplied with the charging power from the EV charger 3 via the electric power receiver 13, the driving voltage generator 35 converts the voltage of the charging power to generate a driving voltage Vic. Alternatively, during discharge of the electrical energy storage device 11, the driving voltage generator 35 converts the voltage of a discharge power of the electrical energy storage device 11 to generate the driving voltage Vic. The driving voltage generator 35 outputs the voltage-converted driving voltage Vic to each part (e.g., the controller 17) in the charge/discharge device 1, thereby supplying the driving power to each part in the charge/discharge device 1. The driving voltage Vic is, for example, 5.0 [V].

The user interface 37 has an input receiving function of receiving an input operation by a user and a notification function of notifying the user of various types of information on the charge/discharge device 1. The user interface 37 can achieve the input receiving function using, for example, a liquid crystal touch panel, an operation button, etc., and can achieve the notification function using a microphone, a speaker, a buzzer, etc.

1-3. Charge Control (Charging of Electrical Energy Storage Device)

From among various control processes performed by the charge/discharge device 1, a charge control process will be described. The various control processes, such as the charge control process, are performed by the controller 17 in the charge/discharge device 1. The charge control process is a control process for charging the electrical energy storage device 11 with the charging power supplied from the EV charger 3.

The controller 17 starts the charge control process upon detecting that the coupling connector 3A of the EV charger 3 has been connected to the electric power receiver 13. The EV charger 3 starts an output control process for outputting electric power from the coupling connector 3A upon detecting that the coupling connector 3A has been connected to the electric power receiver 13 of the charge/discharge device 1.

Here, the charge control process by the controller 17 and the output control process by the EV charger 3 will be described with reference to a sequence diagram (FIG. 3) showing transmission/reception states of the various types of information between the controller 17 and the EV charger 3.

Upon starting the output control process, the EV charger 3 firstly outputs a first charge/discharge start signal, which is one of control signals Sc, to the controller 17 (ST110; ST represents a step). The control signals Sc are transmitted/received between the EV charger 3 and the controller 17 through the control signal terminal 13b.

After starting the charge control process, the controller 17 stands by until the first charge/discharge start signal is received, and upon receiving the first charge/discharge start signal, the controller 17 starts transmission/reception of the various types of information with the EV charger 3 through CAN communication (STf120). The CAN communication between the controller 17 and the EV charger 3 is carried out by transmission/reception of a communication signal St through the CAN communication terminal 13c. For example, the controller 17 transmits information on the electrical energy storage device 11 (electrical energy storage device information) to the EV charger 3 through the CAN communication (ST130). The electrical energy storage device information includes, for example, a maximum voltage, a battery capacity, a maximum charging time, etc., of the electrical energy storage device 11.

The EV charger 3 makes an adaptability determination as to whether the specification and performances of the charge/discharge device 1 are adapted to a charging operation by the EV charger 3 based on the received electrical energy storage device information (ST140). Upon determining that the charge/discharge device 1 is adapted, the EV charger 3 transmits information on the EV charger 3 (charger information) to the controller 17 (the charge/discharge device 1) (ST150). The charger information includes, for example, a maximum voltage, a maximum current, an improper-state determination value, etc., of the EV charger 3.

The controller 17 makes an adaptability determination as to whether the specification and performances of the EV charger 3 are adapted to the charging operation with the charge/discharge device 1 based on the charger information received from the EV charger 3 (ST160). Upon determining that the EV charger 3 is adapted, the controller 17 transmits, to the EV charger 3, a charging permission signal for communicating completion of preparation for charging (ST170).

That is, the controller 17 and the EV charger 3 each make the adaptability determination as to whether the specification and performances of the other are adapted to the charging operation based on the corresponding received information, and upon making the determination of being adapted, each continues the corresponding control process, thus continuing the charging operation to the electrical energy storage device 11.

Figure 3:
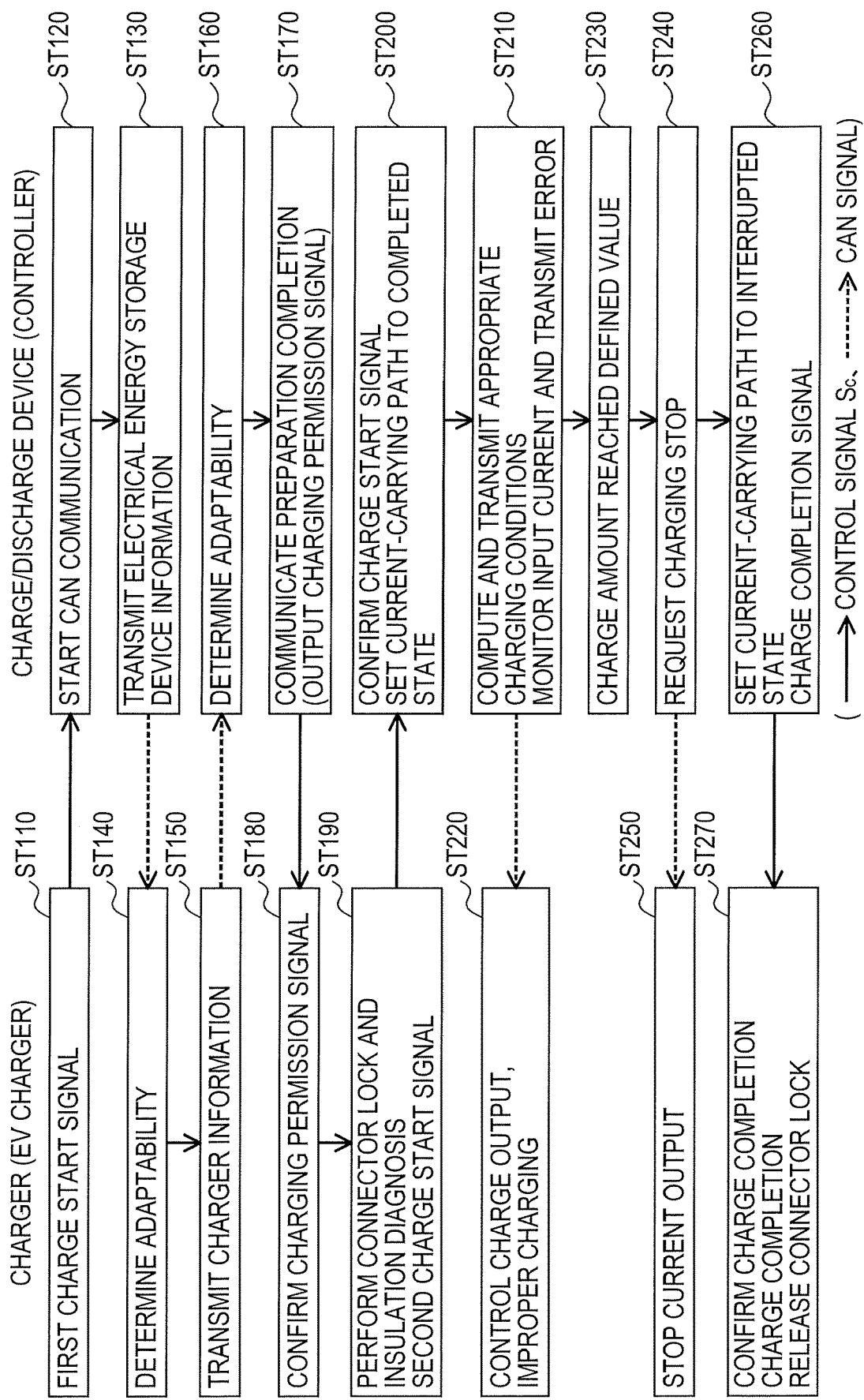
FIG. 3 is a sequence diagram showing transmission/reception states of various types of information between a controller and the charger.

Although not shown in FIG. 3, upon determining that the EV charger 3 is not adapted to the charging operation of the charge/discharge device 1, the controller 17 transmits, to the EV charger 3, the determination result of being unadapted; whereas upon determining that the charge/discharge device 1 is not adapted as an object to be charged, the EV charger 3 transmits, to the controller 17, the determination result of being unadapted. If at least one of the EV charger 3 or the controller 17 determines that the other is unadapted, the both stop the control processes (the charge control process and the output control process), thereby stopping the charging operation to the electrical energy storage device 11.

Upon receiving the charging permission signal from the controller 17 (ST180), the EV charger 3 secures (locks) the connection between the electric power receiver 13 and the coupling connector 3A, and performs a diagnosis on insulation from the circumference in a portion where the electric power receiver 13 and the coupling connector 3A are mutually connected (ST190). Such a securing (locking) operation makes it possible to inhibit the connection between the electric power receiver 13 and the coupling connector 3A from being disengaged during the charging operation. Further, the diagnosis on insulation inhibits occurrence of troubles, such as electric leakage and electric shock. If the result of the diagnosis on insulation is good, the EV charger 3 transmits a second charging start signal to the controller 17 (ST190).

Although not shown in FIG. 3, if the result of the diagnosis on insulation is not good, the EV charger 3 transmits a poor diagnosis result to the controller 17. Then, the EV charger 3 and the controller 17 both stop the control processes, thereby stopping the charging operation to the electrical energy storage device 11.

Upon receiving the second charging start signal, the controller 17 controls the conduction switchers 21 from the interrupted state (open state) to the completed state to set the current-carrying path 19 to the completed state, thereby providing a state in which the charging power supplied from the EV charger 3 can be supplied to the electrical energy storage device 11 (ST200). Subsequently, the controller 17 computes appropriate charging conditions (an appropriate current value, an appropriate voltage value, etc.) at each specified time point based on a current state (a remaining charging energy, a cell temperature, etc.) of the electrical energy storage device 11, and transmits the resulting computed charging conditions (the appropriate current value, the appropriate voltage value, etc.) repeatedly to the EV charger 3 (ST210). The EV charger 3 controls a charge output (an output current value and an output voltage value) based on the charging conditions received from the controller 17 (ST220).

During the charging operation, the controller 17 and the EV charger 3 each monitor whether a charging state is proper, and, upon detection of an improper state, perform a process of dealing with the improper state (change of the charging current value and/or the charging voltage value, stop of the charging operation, etc.), thus inhibiting occurrence of a fatal trouble (ST210, ST220). When performing the charge control of the electrical energy storage device 11, the controller 17 determines whether the electrical energy storage device 11 is in a proper state using the storage information (the cell voltage, the cell temperature, the current value, etc.) acquired by the storage information acquirer 25, the temperature detector 27, and the current detector 29, and upon determining that the electrical energy storage device 11 is in a proper state, the controller 17 performs the charge control; whereas upon determining that the electrical energy storage device 11 is not in a proper state, the controller 17 stops the charge control (ST210).

Upon determining that a charge amount of the electrical energy storage device 11 has reached a defined value (target value) by the continued charging operation (ST230), the controller 17 transmits a charging stop request signal to the EV charger 3 (ST240). Upon receiving the charging stop request signal, the EV charger 3 stops power supply to the charge/discharge device 1 (ST250).

Further, after confirming that the current value of the current-carrying path 19 is in a safe current range (e.g., 5 A or less) based on the detection result in the current detector 29, the controller 17 controls the conduction switchers 21 from the completed state to the interrupted state (open state) to set the current-carrying path 19 to the interrupted state (open state) (ST260). That is, the controller 17 controls the current-carrying path 19 to a state in which power supply from the EV charger 3 (the electric power receiver 13) to the electrical energy storage device 11 cannot be carried out. Additionally, the controller 17 outputs a charge completion signal to the EV charger 3 (ST260).

Upon receiving the charge completion signal, the EV charger 3 disengages the securement (lock) of the connection between the electric power receiver 13 and the coupling connector 3A, thus providing a state in which the coupling connector 3A can be detached from the electric power receiver 13 (ST270).

In this way, the charging operation is complete by termination of the charge control process performed by the controller 17 and termination of the output control process performed by the EV charger 3.

In short, when performing the charge control of the electrical energy storage device 11, the controller 17 determines whether the electrical energy storage device 11 is in a proper state using the storage information (the cell voltage, the cell temperature, the current value, etc.) acquired by the storage information acquirer 25, the temperature detector 27, and the current detector 29, and upon determining that the electrical energy storage device 11 is in a proper state, the controller 17 performs the charge control; whereas upon determining that the electrical energy storage device 11 is not in a proper state, the controller 17 stops the charge control.

1-4. Discharge Control (Discharge of Electrical Energy Storage Device)

From among the various control processes performed by the charge/discharge device 1, a discharge control process will be described. The various control processes, such as the discharge control process, are performed by the controller 17 in the charge/discharge device 1. The discharge control process is a control process for discharging the electrical energy accumulated in the electrical energy storage device 11 to charge the external device 5, in other words, a control process for charging the external device 5 with power supplied from the electrical energy storage device 11.

The controller 17 starts the discharge control process upon receiving a discharge command from the user interface 37 by operation of a user.

Figure 4:
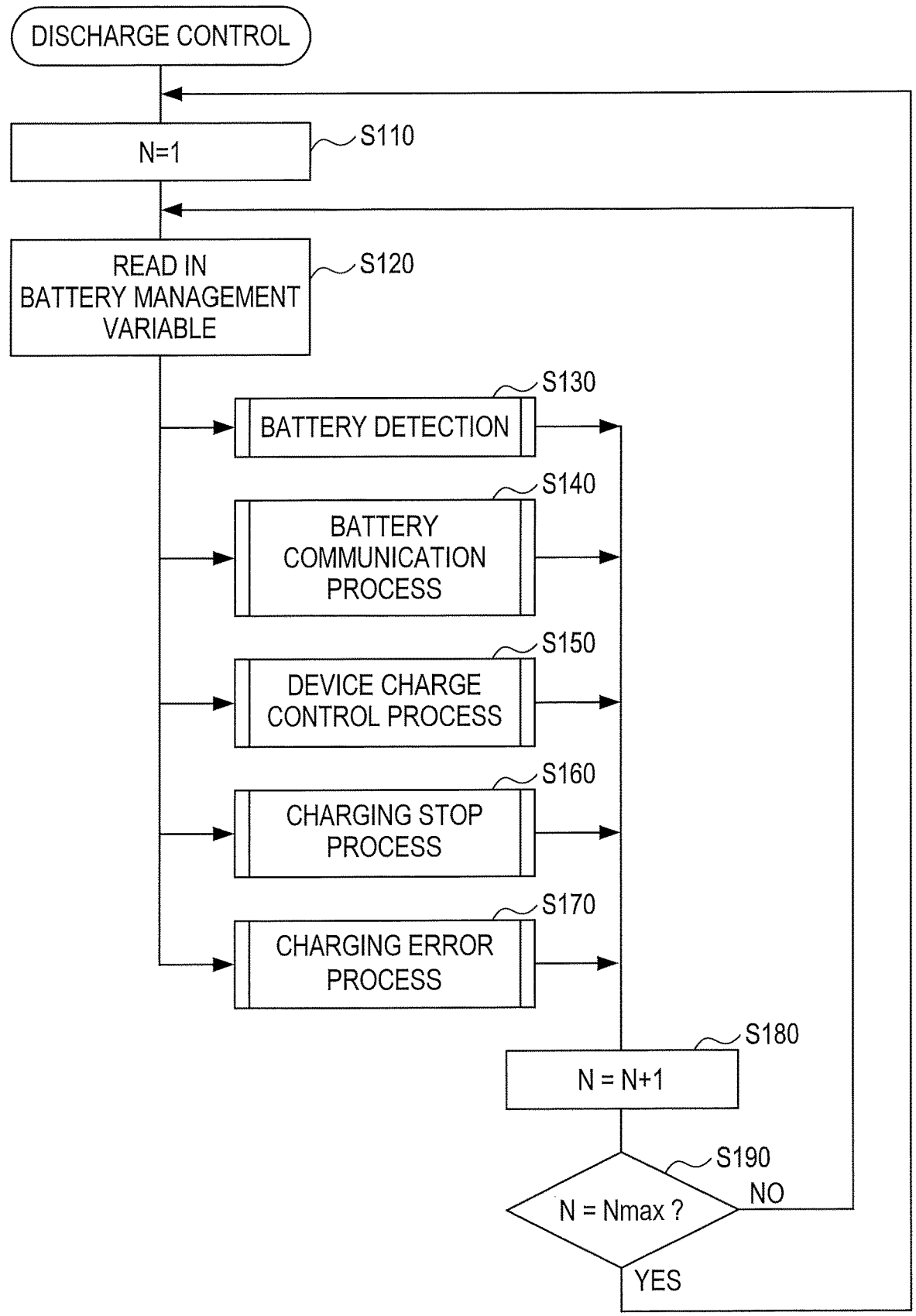
FIG. 4 is a flowchart of a discharge control process.

As shown in FIG. 4, upon starting the discharge control process, the controller 17 firstly sets, in S110 (S represents a step), an initial value (=1) to a counter variable N to initialize the counter variable N (N=1). The counter variable N is a variable for specifying one of the first electric power outputter 15-1 to the nth electric power outputter 15-$n$. The electric power outputter 15 that should be controlled is specified by the counter variable N. In the present embodiment, the number of the electric power outputters 15 in the charge/discharge device 1 is represented as an Nmax.

In subsequent S120, the controller 17 reads in a management variable in an Nth electric power outputter 15 (N: the counter variable) from a management variable table (see FIG. 5A) stored in the memory 17b. The management variable is a variable indicating a management state of the electric power outputter 15 in the discharge control. As shown in FIG. 5B, the management variables in the present embodiment include at least five types, namely, "A: battery detection", "B: battery communication process", "C: device charge control process", "D: charging stop process", and "E: charging error process". As shown in FIG. 5A, the management variable table is arranged in a manner, for example, where the management variable is specified for each of the electric power outputters 15. The memory 17b of the controller 17 also stores various types of information to be used in the various control processes, in addition to the management variable table.

As a result of the determination in S120, if the content of the battery management variable is "A: battery detection", the flow proceeds to S130; if "B: battery communication process", the flow proceeds to S140; if "C: device charge control process", the flow proceeds to S150; if "D: charging stop process", the flow proceeds to S160; and if "E: charging error process", the flow proceeds to S170.

Figure 6:
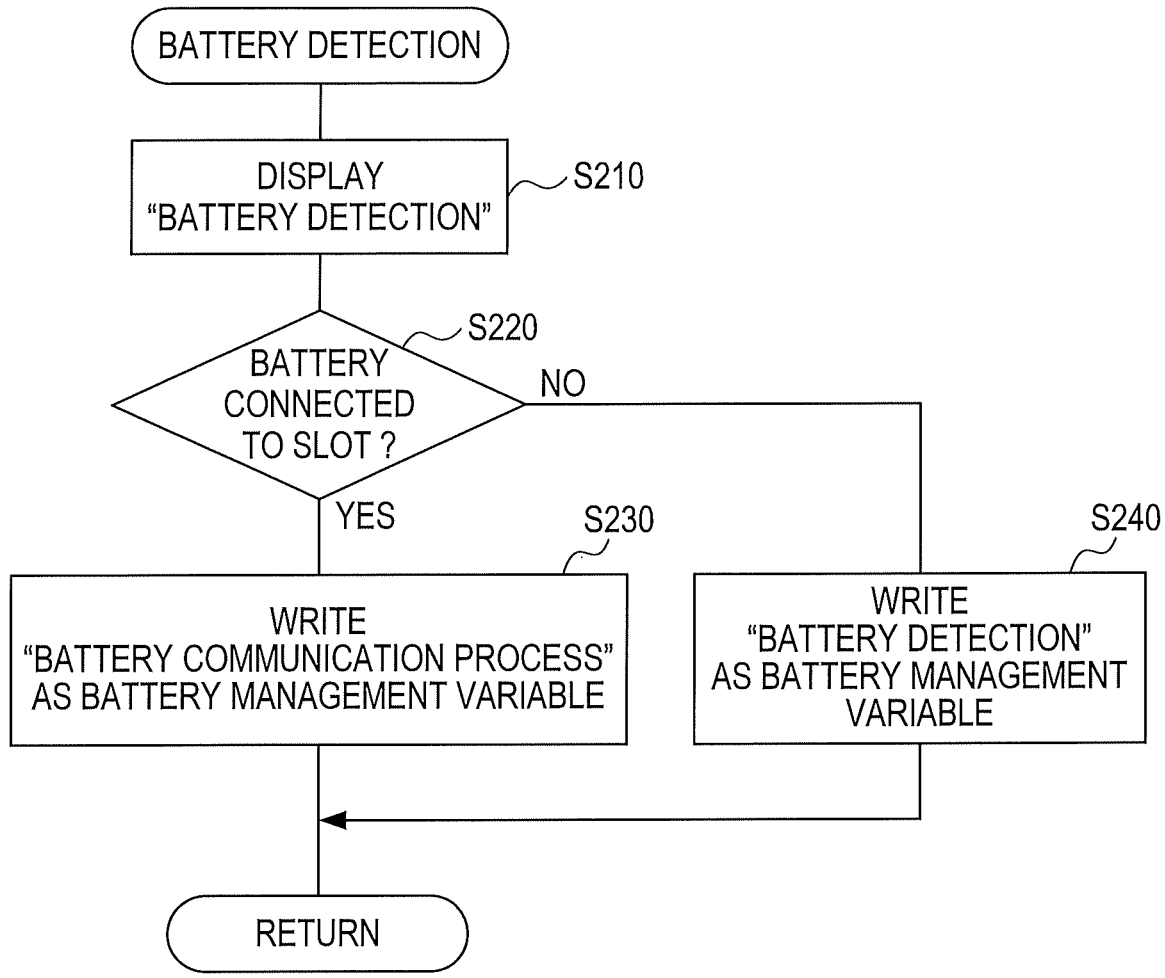
FIG. 6 is a flowchart of a battery detection process.

If the flow proceeds to S130 based on the determination result in S120, the controller 17 performs a battery detection process. As shown in FIG. 6, upon start of the battery detection process, the controller 17 displays, in S210, that connection relevant to the Nth electric power outputter 15 is being detected (battery detection), on the user interface 37. The "connection . . . is being detected" as used herein means that a determination process as to whether the external device 5 (the battery pack 5) is attached (connected) to the Nth electric power outputter 15 is being performed.

In subsequent S220, the controller 17 determines whether the external device 5 (the battery pack 5) is attached to the Nth electric power outputter 15 (hereinafter also referred to as a slot 15). Upon an affirmative determination in S220, the flow proceeds to S230, where the controller 17 writes "battery communication process" as the battery management variable of the Nth electric power outputter 15 in the management variable table. Upon a negative determination in S220, the flow proceeds to S240, where the controller 17 writes "battery detection" as the battery management variable of the Nth electric power outputter 15 in the management variable table.

Upon completion, of the process in S230 or S240, the battery detection process ends, and the flow returns to the discharge control process (FIG. 4) and proceeds to S180.

Figure 7:
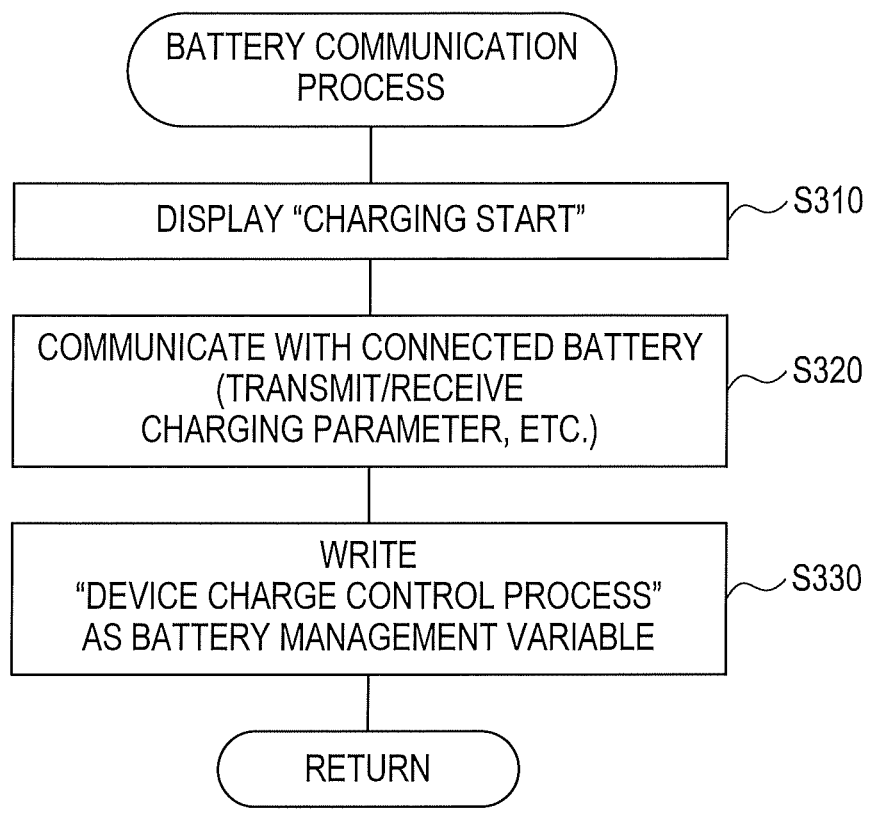
FIG. 7 is a flowchart of a battery communication process.

If the flow proceeds to S140 based on the determination result in S120, the controller 17 performs a battery communication process. As shown in FIG. 7, upon start of the battery communication process, the controller 17 displays, in S310, that charging to the external device 5 connected to the Nth electric power outputter 15 is to be started (charging start), on the user interface 37.

In subsequent S320, the controller 17 establishes a communication path to/from the external device 5 connected to the Nth electric power outputter 15 (the slot 15), and starts transmission/reception of various types of information (e.g., charging parameters). The charging parameters include a charge capacity, a maximum voltage, a maximum charging time, etc., of the external device 5 (the battery pack 5). The controller 17 communicates with the external device 5 via the communication terminal 15c (see FIG. 2) of the electric power outputter 15. In FIG. 2, one communication terminal 15c is depicted for one electric power outputter 15, and one wiring is depicted which connects to the communication terminal 15c; however, the configuration is not limited to this one. For example, a configuration may be adopted in which one electric power outputter 15 includes two or more communication terminals 15c and two or more wirings and communication between the controller 17 and the external device 5 is performed via the two or more communication terminals 15c and the two or more wirings.

In subsequent S330, the controller 17 writes "device charge control process" as the battery management variable of the Nth electric power outputter 15 in the management variable table. Upon completion of the process in S330, the battery communication process ends, and the flow returns to the discharge control process and proceeds to S180.

Figure 8:
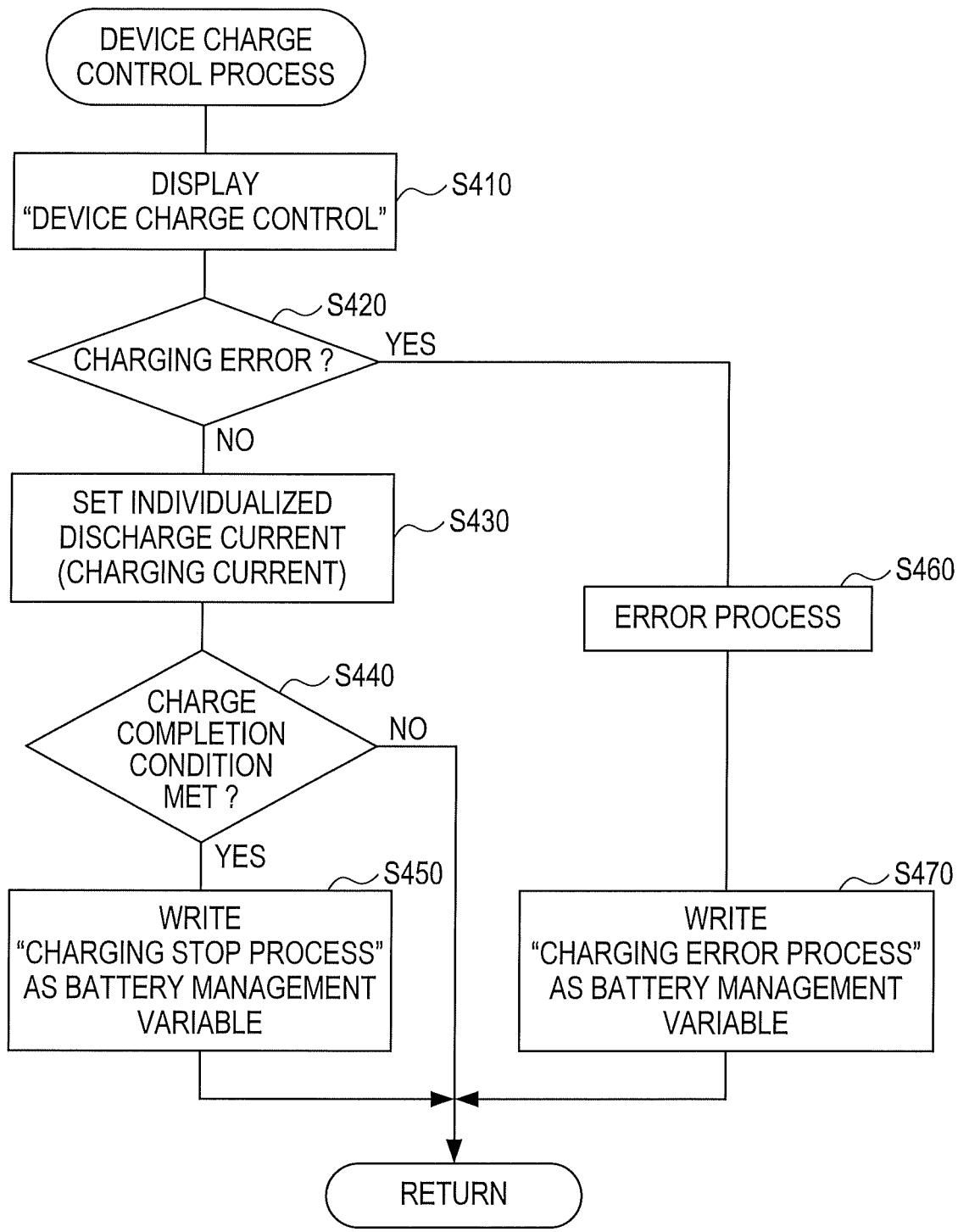
FIG. 8 is a flowchart of a device charge control process.

If the flow proceeds to S150 based on the determination result in S120, the controller 17 performs a device charge control process. As shown in FIG. 8, upon start of the device charge control process, the controller 17 displays, in S410, that charging to the external device 5 connected to the Nth electric power outputter 15 is being controlled (device charge control), on the user interface 37.

In subsequent S420, the controller 17 determines whether a charging error has occurred in the charge control to the external device 5 connected to the Nth electric power outputter 15 (the slot 15). Specifically, the controller 17 determines whether the charging error has occurred based on determination results of whether an error signal has been received from the external device 5, whether a charging current to the external device 5 detected by the output current detector 33 is in a safe range, whether the electrical energy storage device 11 is in a proper state, and so on. Examples of the error signal from the external device 5 may include a signal indicating an improper temperature of the external device 5, and a signal indicating an improper voltage of the external device 5. The determination of whether the electrical energy storage device 11 is in a proper state is made using the storage information acquired by the storage information acquirer 25, the temperature detector 27, and the current detector 29.

Upon a negative determination in S420, the flow proceeds to S430, where the controller 17 sets a value of current of the individualized discharge power to be supplied to the external device 5 (the individualized discharge current value). For example, an appropriate value according to the remaining charging energy of the external device 5, the specification (such as a permissible current value) of the external device 5, and so on is set as the individualized discharge current value, based on the information received from the external device 5.

In subsequent S440, the controller 17 determines whether a charge completion condition has been met, based on whether a charge completion signal has been received from the external device 5. The external device 5 transmits the charge completion signal to the controller 17 when a charge amount of the external device 5 itself has reached a defined value. Upon an affirmative determination in S440, the flow proceeds to S450, where the controller 17 writes "charging stop process" as the battery management variable of the Nth electric power outputter 15 in the management variable table.

Upon an affirmative determination in S420, the flow proceeds to S460, where the controller 17 performs an error process. Specifically, the external device 5 is notified that the charging error has occurred. In subsequent S470, the controller 17 writes "charging error process" as the battery management variable of the Nth electric power outputter 15 in the management variable table.

The device charge control process ends when the controller 17 makes a negative determination in S440, when the process in S450 is complete, or when the process in S470 is complete, and the flow returns to the discharge control process and proceeds to S180.

Figure 9:
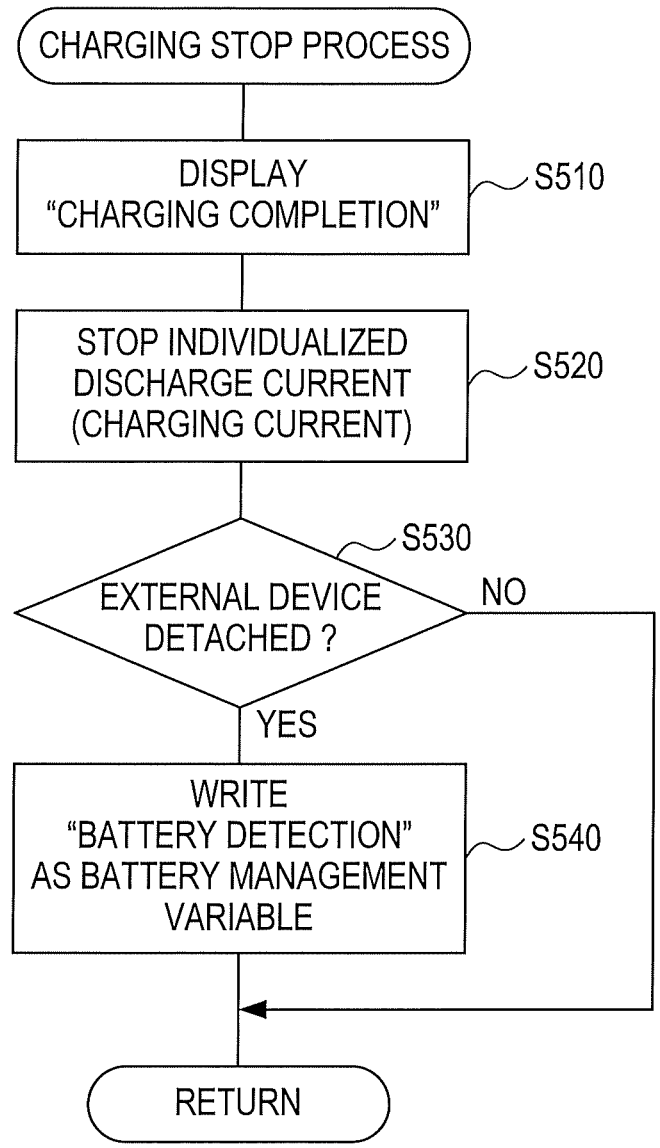
FIG. 9 is a flowchart of a charging stop process.

If the flow proceeds to S160 based on the determination result in S120, the controller 17 performs a charging stop process. As shown in FIG. 9, upon start of the charging stop process, the controller 17 displays, in S510, that charging of the external device 5 connected to the Nth electric power outputter 15 is complete (charging completion), on the user interface 37. In subsequent S520, the controller 17 stops output of an individualized discharge current (the charging current) from the Nth electric power outputter 15 (the slot 15) to the external device 5.

In subsequent S530, the controller 17 determines whether the external device 5 (the battery pack 5) has been detached from the Nth electric power outputter 15 (the slot 15). Upon an affirmative determination in S530, the flow proceeds to S540, where the controller 17 writes "battery detection" as the battery management variable of the Nth electric power outputter 15 in the management variable table.

The charging stop process ends when the controller 17 makes a negative determination in S530 or when the process in S540 is complete, and the flow returns to the discharge control process and proceeds to S180.

Figure 10:
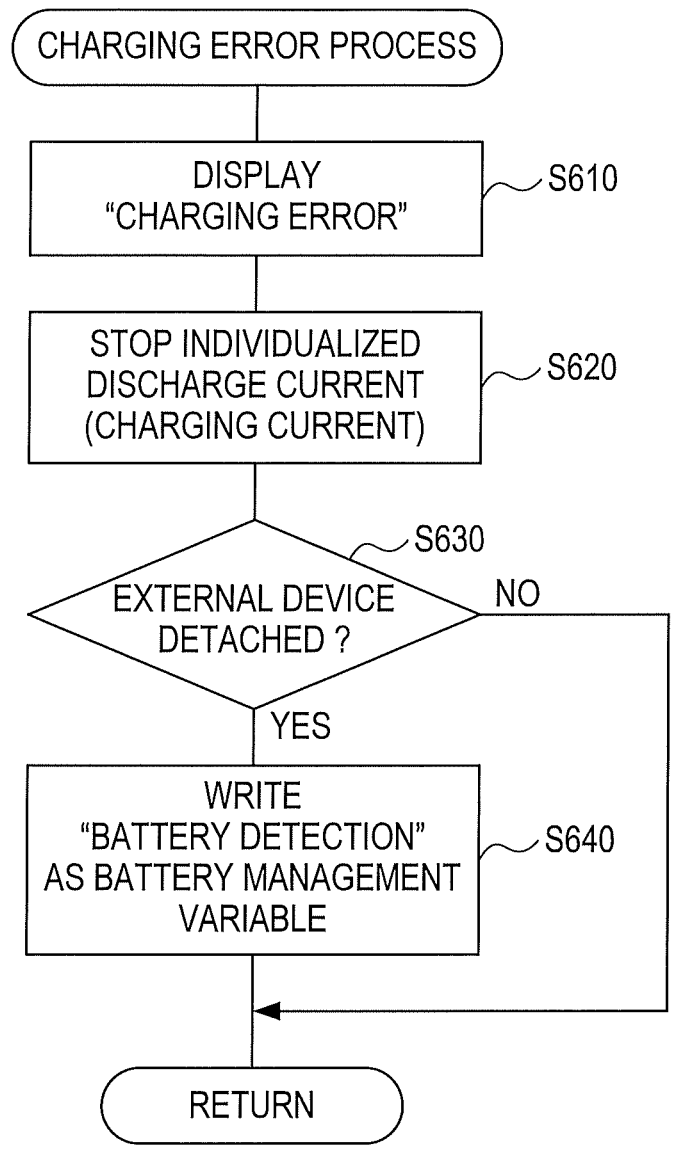
FIG. 10 is a flowchart of a charging error process.

If the flow proceeds to S170 based on the determination result in S120, the controller 17 performs a charging error process. As shown in FIG. 10, upon start of the charging error process, the controller 17 displays, in S610, that the external device 5 connected to the Nth electric power outputter 15 is in a charging error state (charging error), on the user interface 37. In subsequent S620, the controller 17 stops output of the individualized discharge current (the charging current) from the Nth electric power outputter 15 (the slot 15) to the external device 5.

In subsequent S630, the controller 17 determines whether the external device 5 (the battery pack 5) has been detached from the Nth electric power outputter 15 (the slot 15). Upon an affirmative determination in S630, the flow proceeds to S640, where the controller 17 writes "battery detection" as the battery management variable of the Nth electric power outputter 15 in the management variable table.

The charging error process ends when the controller 17 makes a negative determination in S630 or when the process in S640 is complete, and the flow returns to the discharge control process and proceeds to S180.

Upon proceeding to S180 in the discharge control process, the controller 17 performs a process of adding 1 to the counter variable N (N=N+1). In subsequent S190, the controller 17 determines whether the counter variable N is the Nmax, namely the number of the outputters. When the controller 17 makes an affirmative determination in S190, the flow proceeds to S110 again; whereas when the controller 17 makes a negative determination in S190, the flow proceeds to S120 again.

By performing the discharge control process as described above, namely by changing the counter variable N from 1 up to the Nmax sequentially and then setting the counter variable N to 1 again, the controller 17 performs a process corresponding to the management state for each of the electric power outputters 15. In other words, by performing the discharge control process, the controller 17 determines whether the external device 5 (the battery pack 5) has been connected for each of the electric power outputters 15, and also carries out a control of discharge to the connected external device 5 (i.e., the charge control of the external device 5).

Hereat, for example, in a case where the charge capacity of the external device 5 (the battery pack 5) is 108 Wh (voltage 18 [V], current capacity [6 Ah]), an electrical energy of approximately 4.3 [kWh] is required to charge the external device 5 forty times. Use of the electrical energy storage device 11 (electrical energy: approximately 8.0 [kWh]) in a full charge state makes it possible to supply the electric power required to charge the above-described external device 5 forty times.

In a case where one discharge power generator 31 outputs the individualized discharge power to one electric power outputter 15 with the individualized discharge current of 6 [A], the time required to charge the battery pack 5 having a current capacity of 6 [Ah] is one hour (=6 [Ah]/6 [A]).

1-5. Effects

The above-described embodiment produces the following effects.

(1a) The charge/discharge device 1 is configured to receive charging power for charging the electrical energy storage device 11 from the EV charger 3. The EV charger 3 is configured to be able to supply a greater electrical energy per unit time than a commercial AC power supply (e.g., voltage value: 100 V, current value: 10 A). Thus, as compared with a case of using the commercial AC power supply, the charge/discharge device 1 can achieve a greater electrical energy chargeable per unit time, thus reducing the time required to charge the electrical energy storage device 11. As described above, to charge the electrical energy storage device 11 (having the charge capacity of approximately 8.0 kWh) with voltage of 200 V and electric current of 120 A using the EV charger 3, the time required for charging is approximately 0.33 hour (approximately 20 minutes).

Moreover, since the charge/discharge device 1 includes the first electric power outputter 15-1 and the second electric power outputter 15-2, it is possible to concurrently supply power to the first external device 5-1 and the second external device 5-2, respectively. In other words, since the charge/discharge device 1 includes the two or more electric power outputters 15, it is possible to supply power to the two or more external devices 5 (the two or more battery packs 5) concurrently.

Furthermore, since the individually set power Pp is supplied as the individualized discharge power to be supplied from the electric power outputter 15 to the external device 5, the charge/discharge device 1 can supply sufficient electric power as an electrical energy per unit time, to each of the external devices 5 connected to a corresponding one of the electric power outputters 15. This enables the charge/discharge device 1 to supply sufficient electric power to the external device 5 that consumes much electric power as well. For example, when the battery pack 5 is connected as the external device 5 as described above, since the electrical energy suppliable per unit time by the charge/discharge device 1 is large, the time required to charge the battery pack 5 can be reduced. As described above, in the case where one discharge power generator 31 outputs the individualized discharge power to one electric power outputter 15 with the individualized discharge current of 6 [A], the time required to charge the battery pack 5 having a current capacity of 6 [Ah] is one hour (=6 [Ah]/6 [A]).

Accordingly, as compared with the case of using a general commercial power supply, the charge/discharge device 1 enables reduction of the time required to charge the electrical energy storage device 11, as well as concurrent power supply to the two or more external devices 5 (the two or more battery packs 5).

(1b) For example, when loaded in a work vehicle used for transportation of workers, the charge/discharge device 1 can charge the electrical energy storage device 11 using the EV charger 3 while the workers are moving over to the job site. The time required for charging in that case is approximately 20 minutes or so as described above; thus use of the charge/discharge device 1 makes it easy to secure the charging time on the way of movement.

Further, on the job site, when the remaining charging energy of the battery pack is decreased in association with use of the electric gardening apparatus (e.g., the gardening blower), an operation of charging the battery pack 5 can be performed using the charge/discharge device 1. At this time, since the charge/discharge device 1 can charge the two or more battery packs 5 concurrently, in a use application, as well, in which decrease in the remaining charging energy occurs in the two or more battery packs 5 in a short time as in a case where multiple workers each use the electric gardening apparatus, the time required to charge the two or more battery packs 5 can be reduced.

(1c) In the charge/discharge device 1, the electric power generator 30 includes the first discharge power generator 31-1 and the second discharge power generator 31-2, whereby the voltage value and current value of a first discharge power to be outputted to the first electric power outputter 15-1 can be set so as to be different from the voltage value and current value of a second discharge power to be outputted to the second electric power outputter 15-2.

In other words, since the charge/discharge device 1 includes the two or more discharge power generators 31, the voltage values and current values of the individualized discharge powers to be outputted to the electric power outputters 15 each can be set to different voltage value and current value depending on the corresponding electric power outputter 15. This enables the charge/discharge device 1 to supply an individualized electric power corresponding to each of the external devices 5 (the battery packs 5), thus enabling power supply with appropriate voltage value and current value set individually according to a type and so on of each external device 5.

(1d) When performing the charge control of the electrical energy storage device 11, the controller 17 determines whether the electrical energy storage device 11 is in a proper state using the storage information (the cell voltage, the cell temperature, the current value, etc.) acquired by the storage information acquirer 25, the temperature detector 27, and the current detector 29, and upon determining that the electrical energy storage device 11 is in a proper state, the controller 17 performs the charge control; whereas upon determining that the electrical energy storage device 11 is not in a proper state, the controller 17 stops the charge control (ST210).

Since this enables the controller 17 to determine whether the electrical energy storage device 11 is in a proper state in the charge control of the electrical energy storage device 11, the electrical energy storage device 11 in a proper state can be charged appropriately, and a trouble to be caused by the charging operation to the electrical energy storage device 11 not in a proper state can be inhibited. Examples of the storage information may include a temperature of the electrical energy storage device and a voltage value in the electrical energy storage device. Examples of the trouble in the charge control may include failure of or damage to the charge/discharge device 1, and failure of or damage to the EV charger 3.

Moreover, when performing the discharge control of the electrical energy storage device 11, the controller 17 determines whether a charging error (improper state) has occurred in the charge control to the external device 5 connected to the electric power outputter 15 (the slot 15) (S420). Specifically, the controller 17 determines whether the charging error has occurred based on determination results of whether an error signal has been received from the external device 5, whether a charging current to the external device 5 detected by the output current detector 33 is in a safe range, whether the electrical energy storage device 11 is in a proper state, and so on.

Then, upon determining in S420 that no charging error has occurred (i.e., that the external device 5 is in a proper state), the controller 17 performs the discharge control (S430), and upon determining in S420 that the charging error has occurred (i.e., that the external device 5 is not in a proper state), the controller 17 stops the discharge control (S470, S620).

That is, since the controller 17 can determine whether each of the external devices 5 is in a proper state in the discharge control of the electrical energy storage device 11, the external device 5 in a proper state can be supplied with power appropriately, and a trouble to be caused by power supply to the external device 5 not in a proper state can be inhibited. Examples of the trouble in the discharge control may include failure of or damage to the charge/discharge device 1, and failure of or damage to the external device 5.

Furthermore, since the controller 17 can determine whether the electrical energy storage device 11 is in a proper state in the discharge control of the electrical energy storage device 11, discharge can be performed appropriately by the electrical energy storage device 11 in a proper state, and a trouble to be caused by the discharge operation by the electrical energy storage device 11 not in a proper state can be inhibited. Examples of the trouble in the discharge control may include failure of or damage to the charge/discharge device 1, and failure of or damage to the external device 5.

(1e) The charge/discharge device 1 includes the current detector 29 (a first current detector), whereby a value of a first current flowing through the electrical energy storage device 11 can be detected in performing the charge control of the electrical energy storage device 11. This enables the charge/discharge device 1 (specifically the controller 17) to determine whether the value of the first current is within a normal range, thereby achieving the charge control based on the proper current value.

Moreover, by including the current detector 29 (the first current detector), the charge/discharge device 1 can detect the value of the first current outputted from the electrical energy storage device 11 in performing the discharge control of the electrical energy storage device 11, and can determine whether the value of the first current is within the normal range, thereby achieving the discharge control based on the proper current value.

Furthermore, the charge/discharge device 1 includes the output current detectors 33 (second current detectors), whereby at least one current value in the individualized discharge powers to be outputted to the external devices 5 can be detected in performing the discharge control of the electrical energy storage device 11. This enables the charge/discharge device 1 (specifically the controller 17) to determine whether the value of current of the individualized discharge power flowing to the external device 5 is within a normal range, thereby achieving the discharge control based on the proper individualized discharge current.

(1f) In the charge/discharge device 1, the output current detectors 33 (the second current detectors) are provided corresponding to all of the electric power outputters 15. Thus, the output current detectors 33 can detect all of the current values in the individualized discharge powers (the individualized discharge current values). The controller 17 is configured to perform the discharge control of the electrical energy storage device 11 using all of the current values in the individualized discharge powers acquired (detected) by the output current detectors 33.

This enables the charge/discharge device 1, in performing the discharge control of the electrical energy storage device 11, to determine whether the current values are within a normal range for all of the individualized discharge powers to be outputted to the external devices 5 by using all of the current values in the individualized discharge powers. Accordingly, the charge/discharge device 1 can achieve the discharge control based on the proper individualized discharge power in every external device 5.

The charge/discharge device 1 corresponds to one example of the charge/discharge device in the present disclosure, the electrical energy storage device 11 corresponds to one example of the electrical energy storage device in the present disclosure, the electric power receiver 13 (the charging connector 13) corresponds to one example of the electric power receiver in the present disclosure, and the electric power generator 30 corresponds to one example of the electric power generator in the present disclosure. Any one of the discharge power generators 31 corresponds to one example of the first discharge power generator in the present disclosure, and another one of the discharge power generators 31 corresponds to one example of the second discharge power generator in the present disclosure. Any one of the electric power outputters 15 corresponds to one example of the first electric power outputter in the present disclosure, another one of the electric power outputters 15 corresponds to one example of the second electric power outputter in the present disclosure, and the controller 17 corresponds to one example of the controller in the present disclosure.

Further, each of the storage information acquirer 25, the temperature detector 27, and the current detector 29 corresponds to one example of the storage information acquirer in the present disclosure, each of the output current detector 33 and the communication terminal 15c corresponds to one example of the external device information acquirer in the present disclosure, the current detector 29 corresponds to one example of the first current detector in the present disclosure, and the output current detector 33 corresponds to one example of the second current detector in the present disclosure.

2. Other Embodiments

Although the embodiment of the present disclosure has been described so far, the present disclosure is not limited to the above-described embodiment, and can be implemented in various forms in a range not departing from the gist of the present disclosure.

(2a) In the above-described embodiment, the respective individualized discharge voltages Vcn outputted by the discharge power generators 31 all have the same voltage value; however, the discharge power generators 31 are not limited to such a configuration. For example, the discharge power generators 31 may be configured such that each of the individualized discharge voltages Vcn can be set to a different voltage value depending on the corresponding electric power outputter 15. This enables the charge/discharge device 1 to supply the individualized electric power corresponding to each of the external devices 5, thus enabling power supply based on appropriate voltage value and current value set individually according to a type and so on of each external device 5.

Further, in the case where the individualized discharge voltages Vcn to be outputted to the respective electric power outputters all have the same voltage value, the charge/discharge device is not limited to having the configuration provided with the discharge power generators, and may include a single discharge power generator. In this case, the electric power generator includes two or more electric power output terminals, and the respective electric power output terminals output the individualized discharge voltages having the same voltage value, whereby the individualized discharge voltages can be outputted from the electric power output terminals to the corresponding electric power outputters.

(2b) Various numerical values in the above-described embodiment are not limited to the above-described numerical values. For example, the charge capacity of the electrical energy storage device is not limited to approximately 8.0 kWh, and may be any charge capacity insofar as it is 4.0 kWh or more. Moreover, the EV charger 3 is not limited to the power source that outputs a direct voltage with a maximum voltage of 500 V and a maximum current of 400 A (the EV station quick charger), and may be a high-output charger that can charge the electrical energy storage device within one hour. Furthermore, the discharge power generator 31 is not limited to having the configuration to output the individualized discharge power with the individualized discharge voltage Vcn of 22.0 [V] and the individualized discharge current of 6 [A], and may be configured to be able to output, as the individualized discharge power, an individually set power with a voltage value of 10 V or more and a current value of 6 A or more. Since the individually set power defined as above can be supplied as the individualized discharge power to be supplied from the electric power outputter to the external device, such a charge/discharge device can supply sufficient electric power as an electric power per unit time, to each of the external devices connected to a corresponding one of the electric power outputters. This enables the charge/discharge device to supply sufficient electric power to the external device that consumes much electric power as well. For example, when the battery pack is connected as the external device, since the electrical energy suppliable per unit time by the charge/discharge device is large, the time required to charge the battery pack can be reduced.

(2c) The charger for charging an electric vehicle is not limited to a DC power supply, and may be an AC power supply. In this case, the charge/discharge device may include an AC-DC converter, and may be configured to convert an AC power from the AC power supply into a DC power to charge the electrical energy storage device. Further, the electric power outputted from the electric power outputter to the external device may be the AC power, not the DC power. In this case, the electric power outputter may have a configuration in which the communication terminal 15c is omitted.

(2d) The external device is not limited to the battery pack and may be, for example, an electric hammer, an electric hammer drill, an electric drill, an electric screwdriver, an electric wrench, an electric reciprocating saw, an electric jigsaw, an electric cutter, an electric chainsaw, an electric plane, an electric tacker, an electric nailer, an electric hedge trimmer, an electric lawn mower, an electric lawn trimmer, an electric bush/grass cutter, an electric cleaner, an electric blower, a grinder, and so on.

(2e) A function performed by a single element in the above-described embodiments may be performed by two or more elements, and a function performed by two or more elements may be performed by a single element. At least part of a configuration in the above-described embodiments may be replaced by a known configuration having a similar function. Part of a configuration in the above-described embodiments may be omitted. At least part of a configuration in the above-described embodiments may be added to or replace another configuration in the above-described embodiments. Any and all modes encompassed by the technical ideas specified only by the recitations in the appended claims are embodiments of the present disclosure.

The invention claimed is:

1. A charge/discharge device, comprising:
   an electric power receiving connector including a first positive-electrode and a first negative-electrode, the electric power receiving connector being configured (i) to be removably connected to a charger and (ii) to receive a charging power from the charger, the charging power being an electric power for charging an electric vehicle;
   an electrical energy storage device including a second positive-electrode and a second negative-electrode and being configured to be charged with the charging power;
      a positive-electrode path extending from the first positive-electrode to the second positive-electrode;
      a negative-electrode path extending from the first negative-electrode to the second negative-electrode;
      a first switcher circuit and a second switcher circuit respectively including a first switch and a second switch, the first switch and the second switch being (i) respectively on the positive-electrode path and the negative-electrode path and (ii) configured to respectively complete or interrupt the positive-electrode path and the negative-electrode path;
   a first electric power outputter connected to the negative-electrode path, the first electric power outputter being configured (i) to be removably connected to a first external device and (ii) to output a first discharge power to the first external device;
   a second electric power outputter connected to the negative-electrode path, the second electric power outputter being configured (i) to be removably connected to a second external device and (ii) to output a second discharge power to the second external device, and the second electric power outputter being distinct from the first electric power outputter;
   an electric power generator configured to generate the first discharge power and the second discharge power based on a stored electrical energy in the electrical energy storage device; and
   a controller configured to perform a charge control of the electrical energy storage device and/or a discharge control of the electrical energy storage device.

2. The charge/discharge device according to claim 1, wherein the electric power generator includes:
   a first discharge power generator configured (i) to generate the first discharge power based on the stored electrical energy and (ii) to supply the first discharge power to the first electric power outputter; and
   a second discharge power generator configured (i) to generate the second discharge power based on the stored electrical energy and (ii) to supply the second discharge power to the second electric power outputter, the second discharge power generator being distinct from the first discharge power generator.

3. The charge/discharge device according to claim 1, further comprising:
   a first current detector configured to detect a first current value, the first current value corresponding to a magnitude of an electric current flowing through the negative-electrode path,
   wherein the controller is connected to the first current detector.

4. The charge/discharge device according to claim 1, further comprising:
   a first current detector configured to detect a first current value, the first current value corresponding to a magnitude of a first current flowing through the negative-electrode path; and
   a second current detector configured to detect a second current value and/or a third current value, the second current value corresponding to a magnitude of a second current flowing from the first electric power outputter to the first external device, and the third current value corresponding to a magnitude of a third current flowing from the second electric power outputter to the second external device,
   wherein the controller is connected to the first current detector and to the second current detector.

5. The charge/discharge device according to claim 4, wherein the second current detector is configured to detect both of the second current value and the third current value.

6. The charge/discharge device according to claim 1, wherein the first external device or the second external device includes a battery pack configured to be connected to an electric-powered work machine.

7. The charge/discharge device according to claim 1, wherein the positive-electrode path includes a first partial path (i) extending from the first switch to the second positive-electrode and (ii) connected to the electric power generator.

8. The charge/discharge device according to claim 1, wherein the negative-electrode path includes a second partial path (i) extending from the second switch to the second negative-electrode and (ii) connected to the first electric power outputter and to the second electric power outputter.

9. The charge/discharge device according to claim 1, wherein the electric power receiving connector includes a first communication port and a second communication port,
   the first communication port being (i) connected to the controller and (ii) configured to be removably connected to the charger,
   the second communication port being (i) connected to the controller and (ii) configured to be removably connected to the charger, and the second communication port being distinct from the first communication port.

10. The charge/discharge device according to claim 1,
wherein the first electric power outputter (i) is connected to the controller and (ii) includes a third communication port configured to be removably connected to the first external device, and
wherein the second electric power outputter (i) is connected to the controller and (ii) includes a fourth communication port configured to be removably connected to the second external device.

11. The charge/discharge device according to claim 1, wherein the controller and the electric power generator are configured to perform two-way communication therebetween.

12. The charge/discharge device according to claim 1,
wherein the charge/discharge device further includes a temperature detector configured to detect a temperature of the electrical energy storage device, and
wherein the controller and the temperature detector are configured to perform two-way communication therebetween.

13. The charge/discharge device according to claim 1,
wherein the charger and the electric power receiving connector are configured to be locked irremovably from each other.

14. The charge/discharge device according to claim 1,
wherein the electric power receiving connector is configured to receive (i) a voltage of 50 to 500 volts from the charger and (ii) an electric current of up to 400 amperes from the charger.

15. The charge/discharge device according to claim 1,
wherein the first electric power outputter is configured to output (i) a voltage of 10 volts or greater and (ii) an electric current of 6 amperes or greater, and/or
wherein the second electric power outputter is configured to output (i) a voltage of 10 volts or greater and (ii) an electric current of 6 amperes or greater.

16. The charge/discharge device according to claim 3,
wherein the controller and the first current detector are configured to perform two-way communication therebetween.

17. The charge/discharge device according to claim 4,
wherein the second current detector is on a first output path and/or a second output path, the first output path extending from the negative-electrode path to the first electric power outputter, and the second output path extending from the negative-electrode path to the second electric power outputter.

18. The charge/discharge device according to claim 1,
wherein the first switcher circuit and the second switcher circuit are configured to:
  respectively turn ON the first switch and the second switch based on a first condition being established; and
  respectively turn OFF the first switch and the second switch based on a second condition being established.

19. The charge/discharge device according to claim 18,
wherein the first condition is established based on (i) the electric power receiving connector being connected to the charger and (ii) a magnitude of an electric current flowing through the negative-electrode path being within a first range, the first range being specified in advance.

20. The charge/discharge device according to claim 18,
wherein the second condition is established based on:
  (i) the electric power receiving connector being removed from the charger; or
  (ii) a magnitude of an electric current flowing through the negative-electrode path being outside of a first range, the first range being specified in advance.

21. A method comprising:
connecting an electric power receiving connector to a charger, the electric power receiving connector including a first positive-electrode and a first negative-electrode, the charger being configured to output a charging power for charging an electric vehicle;
completing both of a positive-electrode path and a negative-electrode path based on a first condition being established, the positive-electrode path extending from the first positive-electrode to a second positive-electrode, the negative-electrode path extending from the first negative-electrode to a second negative-electrode, the second positive-electrode and the second negative-electrode respectively corresponding to a positive electrode and a negative electrode of an electrical energy storage device;
charging the electrical energy storage device with the charging power based on both of the positive-electrode path and the negative-electrode path being completed;
generating a first discharge power based on a stored electrical energy in the electrical energy storage device;
generating a second discharge power based on the stored electrical energy, the second discharge power being distinct from the first discharge power;
outputting the first discharge power to a first external device;
outputting the second discharge power to a second external device; and
interrupting both of the positive-electrode path and the negative-electrode path based on a second condition being established.

22. The method according to claim 21, further comprising:
locking a connection between the electric power receiving connector and the charger to render the electric power receiving connector irremovable from the charger.

23. The method according to claim 21,
wherein the first condition is established based on (i) the electric power receiving connector being connected to the charger and (ii) a magnitude of an electric current flowing through the negative-electrode path being within a first range, the first range being specified in advance.

24. The method according to claim 21,
wherein the second condition is established based on:
  (i) the electric power receiving connector being removed from the charger; or
  (ii) a magnitude of an electric current flowing through the negative-electrode path is outside a first range, the first range being specified in advance.

25. A charge/discharge device comprising:
an electric power receiving connector including a first positive-electrode and a first negative-electrode, the electric power receiving connector being configured (i) to be removably connected to a charger and (ii) to receive a charging power from the charger, the charging power being electric power for charging an electric vehicle;
an electrical energy storage device including a second positive-electrode and a second negative-electrode and being configured to be charged with the charging power;

a first electric power outputter configured (i) to be removably connected to a first external device and (ii) to output a first discharge power to the first external device;

a second electric power outputter (i) removably connected to a second external device and (ii) configured to output a second discharge power to the second external device, the second electric power outputter being distinct from the first electric power outputter;

an electric power generator configured to generate the first discharge power and the second discharge power based on a stored electrical energy in the electrical energy storage device;

a controller configured to perform a charge control of the electrical energy storage device and/or a discharge control of the electrical energy storage device;

a first output current detector configured to detect a first output current value, the first output current value corresponding to a magnitude of a current flowing through the first electric power outputter; and a second output current detector configured to detect a second output current value, the second output current value corresponding to a magnitude of a current flowing through the second electric power outputter.

* * * * *